(12) United States Patent
Seo

(10) Patent No.: US 12,388,386 B2
(45) Date of Patent: Aug. 12, 2025

(54) RAPID CHARGE/DISCHARGE SYSTEM

(71) Applicant: HYUNDAI MOBIS CO., LTD., Seoul (KR)

(72) Inventor: Jin Qyu Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 31 days.

(21) Appl. No.: 18/383,176

(22) Filed: Oct. 24, 2023

(65) Prior Publication Data

US 2024/0223115 A1 Jul. 4, 2024

(30) Foreign Application Priority Data

Dec. 28, 2022 (KR) .................. 10-2022-0186975

(51) Int. Cl.
*H02P 27/06* (2006.01)
*B60L 53/24* (2019.01)
*H02J 7/00* (2006.01)

(52) U.S. Cl.
CPC ............. *H02P 27/06* (2013.01); *B60L 53/24* (2019.02); *H02J 7/0068* (2013.01); *H02J 2207/20* (2020.01)

(58) Field of Classification Search
CPC ........ H02P 27/06; B60L 53/24; H02J 7/0068; H02J 2207/20
See application file for complete search history.

(56) References Cited

U.S. PATENT DOCUMENTS

| 9,331,515 B2 | 5/2016 | Feuerstack et al. | |
| 2019/0023136 A1* | 1/2019 | Lee | H02J 7/02 |
| 2024/0100959 A1* | 3/2024 | Ge | H02M 7/53878 |

FOREIGN PATENT DOCUMENTS

| CN | 102201693 A | * | 9/2011 | |
| CN | 107437806 A | | 12/2017 | |
| CN | 110780174 A | | 2/2020 | |
| DE | 102011075927 A1 | * | 11/2012 | ............. B60L 53/22 |
| KR | 10-2282679 B1 | | 7/2021 | |

OTHER PUBLICATIONS

Office action issued on Apr. 8, 2024 for corresponding EP Patent Application No. 23206325.5.

* cited by examiner

*Primary Examiner* — Rexford N Barnie
*Assistant Examiner* — Duc M Pham
(74) *Attorney, Agent, or Firm* — Morgan, Lewis & Bockius LLP

(57) ABSTRACT

The rapid charge and discharge system includes: an inverter connected to a battery and including first to third switch legs to operate to charge or discharge the battery, the inverter including a plurality of switches; first to third inductors each having one end connected to a node between two switches included in a corresponding one of the first to third switch legs of the plurality of switches, and the other end connected to a corresponding one of three phases of a motor; first to third capacitors each having one end connected to the other end of a corresponding one of the first to third inductors, and the other end being grounded; first to third terminals each having one end connected to the other end of a corresponding one of the first to third inductors; a load connected to the first to third terminals; and a control unit controlling at least one of the plurality of switches included in the inverter to be in a charging mode or a discharging mode according to a type of the load.

9 Claims, 4 Drawing Sheets

RAPID CHARGE/DISCHARGE SYSTEM

CROSS-REFERENCE TO RELATED APPLICATIONS

This application claims priority under 35 U.S.C. § 119 to Korean Patent Application No. 10-2022-0186975, filed on Dec. 28, 2022, in the Korean Intellectual Property Office, the disclosure of which is incorporated herein by reference in its entirety.

TECHNICAL FIELD

The following disclosure relates to a rapid charge/discharge system, and more particularly, to a rapid charge/discharge system applicable to a typical three-phase inverter and capable of performing rapid charge for step-up to a high voltage and performing a V2X function while expanding an operating range of a motor.

BACKGROUND

As a way of rapidly charging an electric vehicle at a high voltage (800V), it has been proposed to apply a separate charger or use a winding inductance of a motor.

Recently, electric vehicle manufacturers aiming for high-performance electric vehicles have developed and released high-voltage rapid charge systems. However, most of the rapid charge systems built as infrastructure are 400V systems. Therefore, separate step-up devices are required for charging and discharging at 800V. As a way of providing such a separate step-up device, an expensive part is installed in a charger or an inductance of a winding of a motor is used.

In a case where the inductance of the winding of the motor is used as one of the two ways of rapid charge, it is required that a neutral point of the motor be exposed from the motor for charging, and there is a risk that, if an angle of a position sensor is not accurate when a current flows to the motor, the electric vehicle may move because a torque is momentarily applied to the motor. In addition, the current is continuously applied to the winding of the motor, resulting in a rise in temperature of the motor.

In addition, since the winding of the motor is designed to have optimal specifications for the performance of the motor, there are also problems that a lot of tuning for electromagnetic compatibility (EMC) is required to perform charging, and the specifications of the motor are changed if characteristics of electromagnetic waves cannot be improved.

PRIOR ART DOCUMENT

Patent Document

Korean Patent No. 10-2282679 (entitled "DIRECT ELECTRIC VEHICLE CHARGER" and issued on Jul. 28, 2021)

SUMMARY

An embodiment of the present invention is directed to providing a rapid charge/discharge system capable of implementing a rapid charge mechanism for step-up to a high voltage while expanding an operation range of a motor by adding minimal hardware.

In one general aspect, a rapid charge/discharge system includes: an inverter connected to a battery and including first to third switch legs to operate to charge or discharge the battery; first to third inductors each having one end connected to a node between two switches included in a corresponding one of the first to third switch legs, and the other end connected to a corresponding one of three phases of a motor; first to third capacitors each having one end connected to the other end of a corresponding one of the first to third inductors, and the other end being grounded; first to third terminals each having one end connected to the other end of a corresponding one of the first to third inductors; a load connected to the first to third terminals; and a control unit controlling the switches included in the inverter to be in a charging mode or a discharging mode according to a type of the load.

All of the other ends of the first to third terminals may be connected to the load, such that the three phases of the motor are shorted.

The rapid charge/discharge system may further include a DC link capacitor connected to the battery in parallel.

The rapid charge/discharge system may further include: a current sensor sensing a current flowing between the first to third inductors and the first to third switch legs; a first voltage sensor sensing a voltage between the first to third inductors and the motor; and a second voltage sensor sensing a voltage of the DC link capacitor, wherein the control unit controls the switches included in the inverter using values sensed by the current sensor, the first voltage sensor, and the second voltage sensor.

The rapid charge/discharge system may further include: a current sensor sensing a current flowing between the first to third inductors and the first to third switch legs; and a second voltage sensor sensing a voltage of the DC link capacitor, wherein the load is a charging load that transmits charging voltage information to the control unit, and the control unit controls the switches included in the inverter using values sensed by the current sensor and the second voltage sensor with the charging voltage information received from the charging load.

The rapid charge/discharge system may further include a relay controlled by the control unit and determining whether to connect the first to third terminals and the load to each other.

The control unit may perform initialization when the load is connected to the first to third terminals, and during the initialization, when a phase current is generated in the motor or a position of a rotor of the motor is changed, the control unit may store an initialization error occurrence record, and control the relay to be turned off or stop the operation of the inverter.

The control unit may control the inverter to be in the charging mode or the discharging mode after the initialization, and when a phase deviation of a three-phase current of the motor is greater than a reference value, the control unit may store a contact defect occurrence record, and control the relay to be turned off or stop the operation of the inverter.

After the initialization, the control unit may control the inverter to be in the charging mode or the discharging mode, and when an RPS value changes, the control unit may store a contact defect occurrence record, and control the relay to be turned off or stop the operation of the inverter.

After the initialization, the control unit may stop the operation of the inverter after discharging the first to third inductors and the first to third capacitors.

In a process of discharging the first to third inductors and the first to third capacitors, when a discharge voltage time constant is out of a reference value, the control unit may store a discharge error occurrence record, and control the relay to be turned off or stop the operation of the inverter.

According to the rapid charge/discharge system according to various embodiments of the present invention as described above, by adding an LC network including the first to third inductors and the first to third capacitors between the inverter and the motor, the battery can be rapidly charged at a high voltage without adding any hardware other than the LC network.

In addition, according to the present invention, one control unit controls the inverter to charge or discharge the battery and controls the motor as well, which is advantageous in that the device constituting the rapid charge/discharge system according to the present invention can be simplified.

DETAILED DESCRIPTION OF EMBODIMENTS

Figure 1:
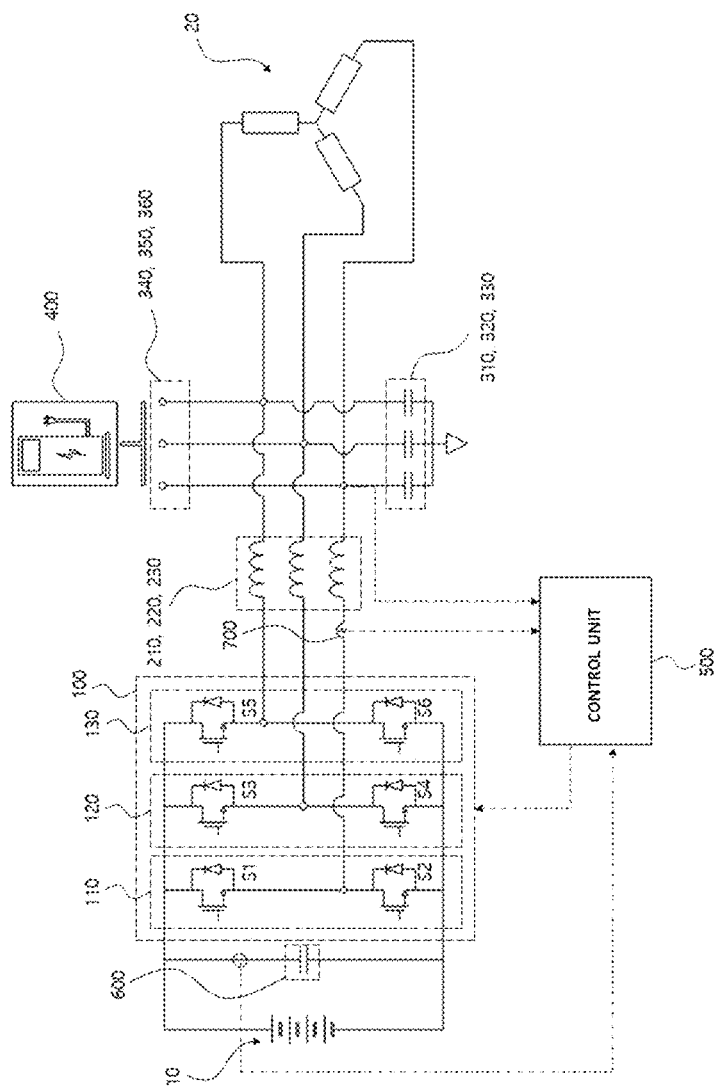
FIG. 1 is a circuit diagram of a rapid charge/discharge system according to a first embodiment of the present invention.

The aforementioned objects, features and advantages of the present invention will be apparent from the embodiments to be described below with reference to the accompanying drawings. The following specific structural or functional descriptions are provided merely for the purpose of describing embodiments according to the concept of the present invention, and the embodiments according to the concept of the present invention can be implemented in various forms and should not be construed as being limited to the embodiments set forth herein. Since various modifications may be made to the embodiments according to the concept of the present invention, and the embodiments of the present disclosure may have various forms, specific embodiments will be illustrated in the drawings and described in detail hereinbelow. However, this is not intended to limit the embodiments according to the concept of the present invention to specific forms disclosed herein, and it should be noted that the specific embodiments described herein cover all modifications, equivalents, or substitutes within the spirit and technical scope of the present invention. Terms "first", "second", and/or the like may be used to describe various components but the components are not limited by the above terms. The above terms are only used to distinguish one component from another component. For example, a first component may be referred to as a second component, and similarly, a second component may be referred to as a first component, without departing from the scope according to the concept of the present disclosure. It should be noted that, when one component is referred to as being "coupled" or "connected" to another component, the one element may be directly coupled or connected to the another element, or the one element may be coupled or connected to the another element through an intervening component therebetween. On the other hand, when one component is referred to as being "directly coupled" to or "directly connected" to another component, there is no intervening component therebetween. Other expressions for describing relationships between components, that is, expressions such as "between", "immediately between", "adjacent to", and "directly adjacent to" shall be construed similarly. Terms used herein are used only to describe the specific embodiments and are not intended to limit the present invention. Singular expressions include plural expressions unless the context clearly indicates otherwise. It should be noted that terms "include", "have", and the like used herein are intended to specify the presence of stated features, numbers, steps, operations, components, parts, or combinations thereof but do not preclude the presence or addition of one or more other features, numbers, steps, operations, components, parts, or combinations thereof. Unless otherwise defined, all terms used herein, including technical or scientific terms, have the same meanings as those generally understood by those skilled in the art to which the present invention pertains. The terms defined in generally used dictionaries and the like should be interpreted as having the same meanings as those in the context of the related art, and should not be interpreted as having ideal or excessively formal meanings unless clearly defined herein. Hereinafter, the present invention will be described in detail by describing preferred embodiments of the present invention with reference to the accompanying drawings. Like reference signs between the drawings indicate like elements.

FIG. 1 is a circuit diagram of a rapid charge/discharge system according to a first embodiment of the present invention.

As illustrated in FIG. 1, the rapid charge/discharge system according to the present invention may include an inverter 100, a first inductor 210 to a third inductor 230, a first capacitor 310 to a third capacitor 330, a first terminal 340 to a third terminal 360, a load 400, and a control unit 500.

The inverter 100 is a voltage type inverter that is connected to a battery 10 of an electric vehicle to control charging and discharging of the battery 10. The inverter 100 includes a first switch leg 110 to a third switch leg 130. The first switch leg 110 to the third switch leg 130 are formed to correspond to three phases of a motor 20, respectively, and may be connected to each other in parallel and may also be connected to the battery 10 in parallel. Each of the first switch leg 110 to the third switch leg 130 includes two switches connected in series with each other, and the switches included in the first switch leg 110 to the third switch leg 130 will be referred to as a first switch S1 to a sixth switch S6, respectively. The first switch S1 to the sixth switch S6 are controlled by a control unit 500 to be described below.

One end of each of the first inductor 210 to the third inductor 230 is connected to a node between the two switches included in the corresponding one of the first switch leg 110 to the third switch leg 130, and the other end of each of the first inductor 210 to the third inductor 230 is connected to a corresponding one of three-phase windings of the motor 20.

One end of each of the first capacitor 310 to the third capacitor 330 is connected to the other end of the corresponding one of the first inductor 210 to the third inductor 230, and the other end of each of the first capacitor 310 to the third capacitor 330 is grounded.

By employing an LC network including the first inductor 210 to the third inductor 230 and the first capacitor 310 to the third capacitor 330, the rapid charge/discharge system according to the present invention is capable of driving a high-speed motor that could not be driven when the voltage of the inverter 100 is restricted to lower than the maximum voltage. Also, the dynamic characteristics of the LC network significantly reduce switching noise generated in the inverter and introduced into the motor thereby maximizing the winding insulation resistance of the motor 20, which is helpful in extending the lifespan of the motor 20.

One end of each of the first terminal 340 to the third terminal 360 is connected to the other end of the corresponding one of the first inductor 210 to the third inductor 230, and the other end of each of the first terminal 340 to the third terminal 360 is connected to the load 400 to be described below.

The first terminal 340 to the third terminal 360 are provided for connection to the load 400, and serve as ports for receiving power from the load 400 (charging operation) or transferring power to the load 400 (discharging operation).

The load 400 may be a charging load or a discharging load. When the load 400 is a charging load, the charging load may be a direct current. The direct current supplied from the load 400 is stepped up by the inverter 100 through the first inductor 210 to the third inductor 230, and then transferred to the battery 10 to charge the battery 10. The load 400 transfers the power to the battery 10 in contact with all of the first terminal 340 to the third terminal 360, and the first terminal 340 to the third terminal 360 are electrically connected to all of the three phases of the motor 20, such that the phases of the motor 20 have the same voltage and are shorted. As a result, no current flows from the load 400 to the motor 20.

The control unit 500 controls the switches included in the inverter 100 to be in a charging mode or a discharging mode depending on the type of the load 400. The control unit 500 may be implemented by a device including a kind of electronic device, and may be connected to each of the switches included in the inverter 100 in a wired manner or in a wireless manner to apply a control signal to each of the switches included in the inverter 100. According to an exemplary embodiment of the present disclosure, the control unit 500 may include a processor (e.g., computer, microprocessor, CPU, ASIC, circuitry, logic circuits, etc.) and an associated non-transitory memory storing software instructions which, when executed by the processor, provides the functionalities of the control unit 500. Herein, the memory and the processor may be implemented as separate semiconductor circuits. Alternatively, the memory and the processor may be implemented as a single integrated semiconductor circuit. The processor may embody one or more processor(s).

As illustrated in FIG. 1, the rapid charge/discharge system according to the first embodiment of the present invention further includes a DC link capacitor 600. The DC link capacitor 600 is connected to the battery 10 in parallel.

The control unit 500 controls the switches included in the inverter 100 according to a voltage of the load 400, a current flowing through the first inductor 210 to the third inductor 230, and a voltage of the DC link capacitor 600. The control unit 500 may charge or discharge the battery 10 by controlling the switches included in the inverter 100 using various methods such as frequency control, PWM control, and PI control. In addition, the control unit 500 may control the inverter 100 in controlling the motor 20 while a normal electric vehicle is operating, that is, driving. Since one control unit 500 is responsible for not only charging and discharging the battery 10 but also controlling the motor 20, there is no need to add another control unit, thereby simplifying the system.

Through the above-described configuration of the present invention, it is possible to apply an active LC network that enables driving at the maximum speed with the maximum torque even under lower than the maximum voltage, beyond an existing passive driving configuration such as an inverter-motor combination. By using such an LC network, a rapid charge/discharge system, for example, for 800V charging, can be implemented without any additional device other than the LC network.

In order to acquire information on the current flowing through the first inductor 210 to the third inductor 230 and the voltage of the DC link capacitor 600 from the control unit 500, the rapid charge/discharge system according to the first embodiment of the present invention may further include a current sensor 700, a first voltage sensor, and a second voltage sensor as illustrated in FIG. 1.

The current sensor 700 is located between the first inductor 210 to the third inductor 230 and the first switch leg 110 to the third switch leg 130 to sense a current flowing through the first inductor 210 to the third inductor 230. Although only one current sensor 700 is illustrated in the drawing, the current sensor may be installed in each of the first inductor 210 to the third inductor 230 to sense a current flowing in each of the three phases.

The first voltage sensor senses a voltage between each of the first inductor 210 to the third inductor 230 and the motor 20 to sense a voltage from the load 400. Since both ends of the first voltage sensor need to be connected to each of the first inductor 210 to the third inductor 320 and the ground, the first voltage sensor is not particularly illustrated in the drawing.

The second voltage sensor is disposed at one end of the DC link capacitor 600 to sense a voltage of the DC link capacitor 600. The second voltage sensor is also not particularly illustrated in the drawing. Since the DC link capacitor 600 is connected to the battery 10 in parallel, the second voltage sensor substantially senses a voltage of the battery 10.

Each of the current sensor 700, the first voltage sensor, and the second voltage sensor may transmit a sensed value to the control unit 500, and to this end, the sensors and the control unit 500 may include respective communication modules according to a predetermined communication protocol.

Figure 2:
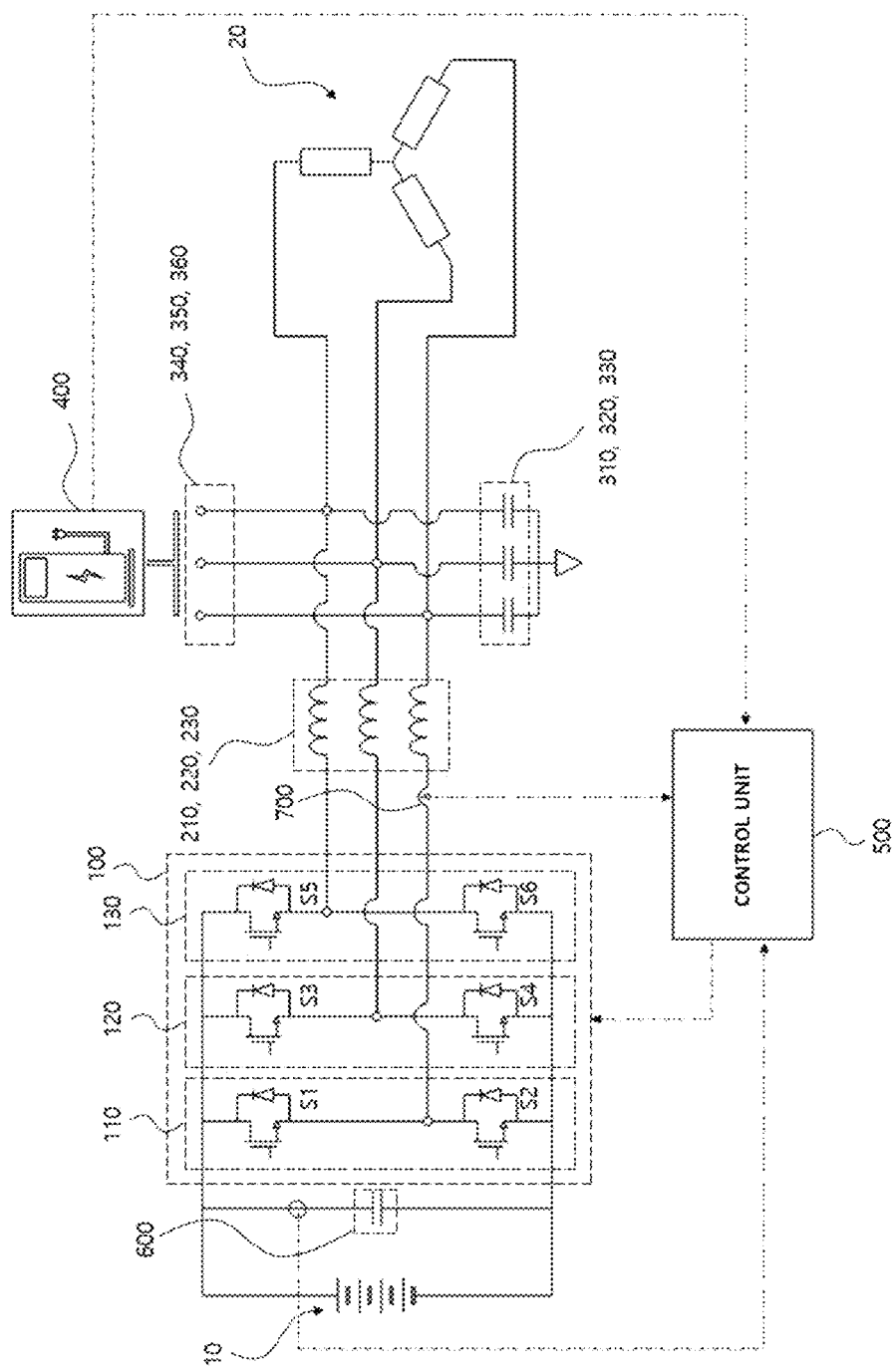
FIG. 2 is a circuit diagram of a rapid charge/discharge system according to a second embodiment of the present invention.

FIG. 2 is a circuit diagram of a rapid charge/discharge system according to a second embodiment of the present invention.

In some cases, it may be difficult to sense a voltage from the load 400. In this case, as illustrated in FIG. 2, the rapid charge/discharge system according to the second embodiment of the present invention may directly transmit charging voltage information from the load 400 to the control unit 500. To this end, the load 400 and the control unit 500 may be connected to each other to transmit and receive signals, and each of the load 400 and the control unit 500 may include respective communication modules according to a predetermined communication protocol. In this case, the communication protocol is a power line communication (PLC) or a controller area network (CAN).

Figure 3:
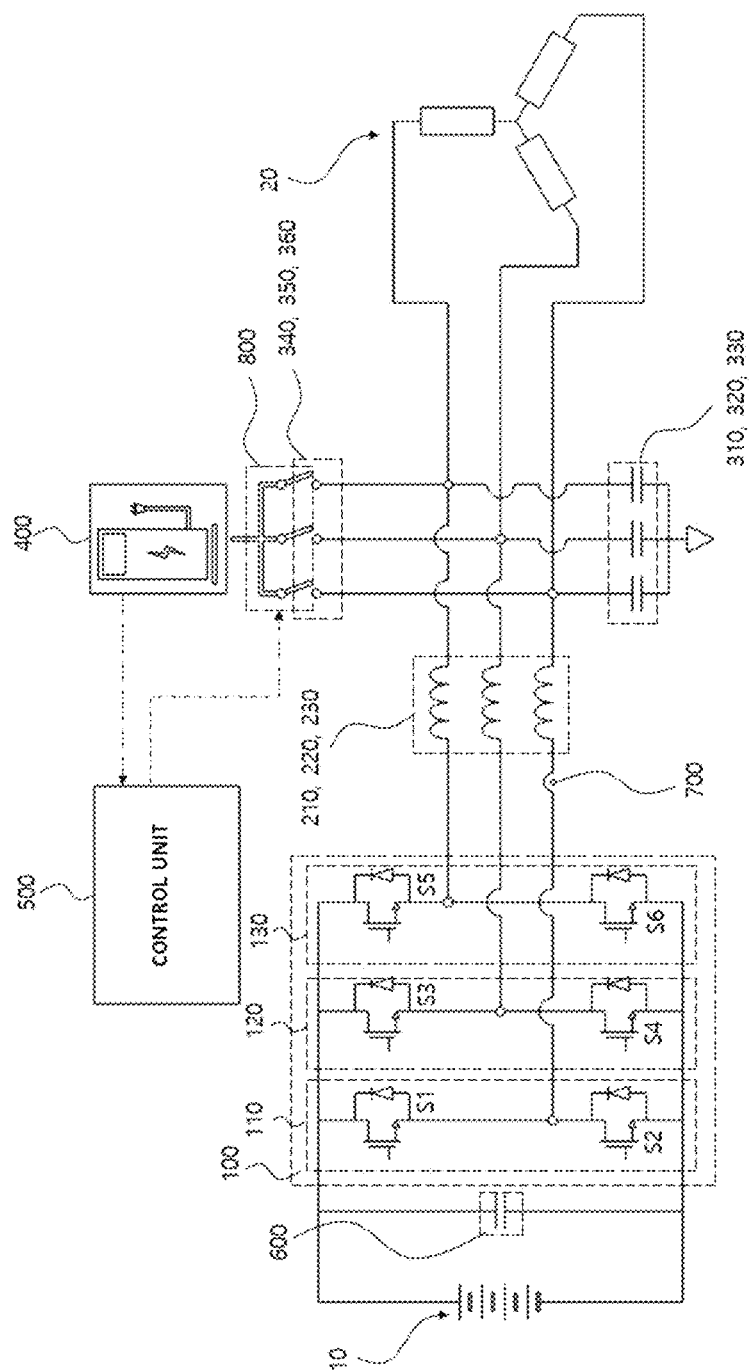
FIG. 3 is a schematic diagram of a rapid charge/discharge system according to a modification of the first embodiment of the present invention.

FIG. 3 is a schematic diagram of a rapid charge/discharge system according to a modification of the first embodiment of the present invention.

As illustrated in FIG. 3, the rapid charge/discharge system according to the modification of the first embodiment of the present invention further includes a relay 800.

The relay 800 may be controlled by the control unit 500, and may determine whether to connect the first terminal 340 to the third terminal 360 and the load 400 to each other. Three relays 800 may be formed to correspond to the first terminal 340 to the third terminal 360, respectively. The relay 800 is turned on to electrically connect the load 400 and the first terminal 340 to the third terminal 360 to each other, and the relay 800 is turned off to electrically disconnect the load 400 and the first terminal 340 to the third terminal 360 from each other.

The relay 800 may be mechanical or electronic. When the relay 800 is implemented electronically, a fastening lock button on a station, that is, the load 400, which is a rapid charger, needs to be configured to be driven together with the relay. Here, the fastening lock may of refer to a kind mechanical/electrical device that maintains the state of the relay 800 when the relay 800 is turned on or off. The fastening lock button and the relay 800 may be electronically driven together, or the fastening locking button may be manually driven independently from the relay 800 even though the relay 800 is driven electronically.

Figure 4:
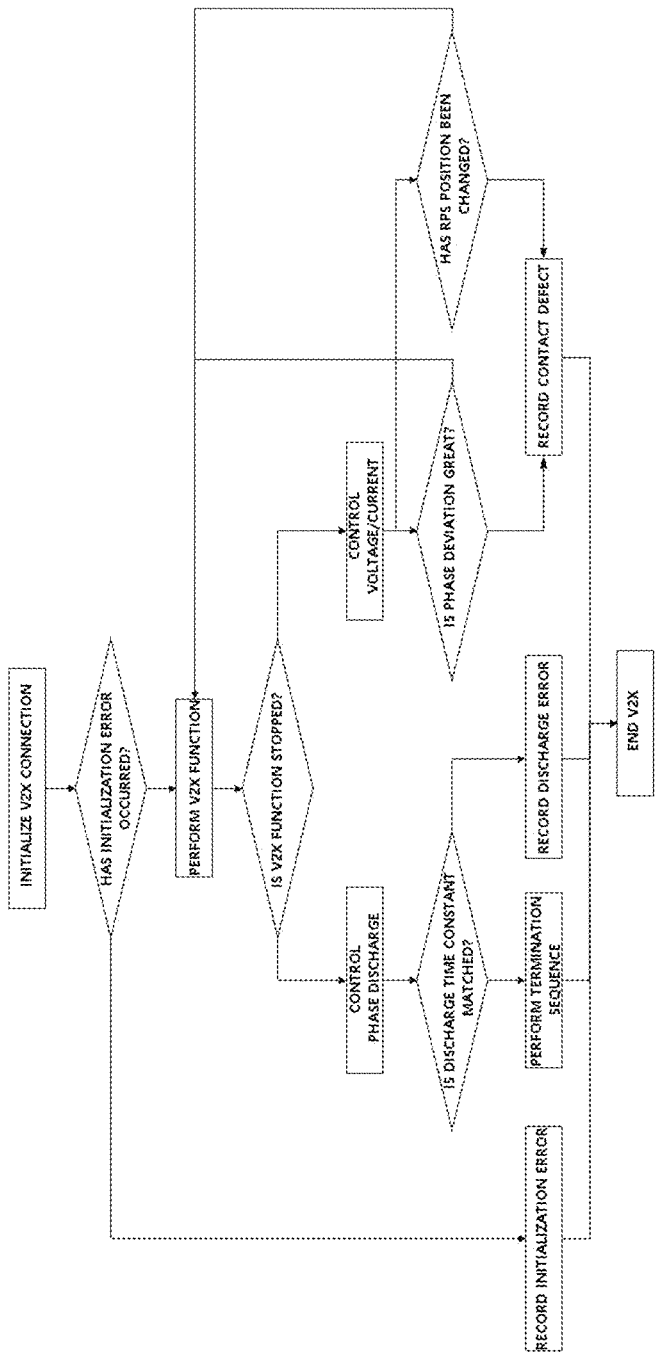
FIG. 4 is a flow chart of a charge/discharge operation of the rapid charge/discharge system according to the first embodiment of the present invention.

FIG. 4 is a flow chart of a charge/discharge operation of the rapid charge/discharge system according to the first embodiment of the present invention.

The rapid charge/discharge system according to various embodiments of the present invention may include a vehicle to everything (V2X) function. V2X means that a vehicle exchanges information with objects such as other vehicles, mobile devices, and roads through wired and wireless networks. Also, V2X does not simply mean transfer of information, and may mean that an electric vehicle equipped with the battery 10 serves as a kind of power supply by supplying power stored in the battery 10. When the V2X function is performed, the load 400 may become a discharge load that consumes power, and at this time, the power stored in the battery 10 may be stepped down through the operation of the inverter 100 and then supplied to the load 400.

As illustrated in FIG. 4, the control unit 500 may initialize an existing V2X connection before the V2X function is performed by the rapid charge/discharge system according to the first embodiment of the present invention. In the process of initializing the V2X connection, the control unit 500 may monitor the rapid charge/discharge system according to the present invention through information received from each of the sensors. More specifically, the control unit 500 determines that an initialization error has occurred when a position of a rotor of the motor 20 is changed or when an initial charging time does not match a set value due to non-uniform contact, which generates a phase current in the motor. Thereafter, the control unit 500 may store an initialization error occurrence record, and stop the operation of the inverter 100 by turning off the relay 800.

After the V2X function is initialized, even when a normal (charging or discharging) operation is performed, the control unit 500 may monitor whether the system operates normally through information received from each of the sensors. More specifically, after the initialization, when a phase deviation of a three-phase current of the motor 20 is greater than a reference value, the control unit 500 stores a contact defect occurrence record, and stops the operation of the inverter 100 by turning off the relay 800.

In addition, when an RPS value changes during normal operation, the control unit 500 stores a contact defect occurrence record, and stops the operation of the inverter 100 by turning off the relay 800.

When the charging or discharging operation of the rapid charge/discharge system according to the present invention is stopped, the control unit 500 discharges the first inductor 210 to the third inductor 230 and the first capacitor 310 to the third capacitor 330 before the charging or discharging operation is stopped. The foregoing operation of the control unit 500 is to prevent the motor 20 from being driven by power remaining in the first inductor 210 to the third inductor 230 and the first capacitor 310 to the third capacitor 330. However, an error may occur even while the first inductor 210 to the third inductor 230 and the first capacitor 310 to the third capacitor 330 are being discharged. More specifically, during the process of discharging the first inductor 210 to the third inductor 230 and the first capacitor 310 to the third capacitor 330, when a discharge voltage time constant is out of a reference value or a reference range, the control unit 500 stores a discharge error occurrence record, turns off the relay 800, and stops the operation of the inverter 100.

The rapid charge/discharge system according to the first embodiment of the present invention may further include a separate memory unit for storing the error occurrence records.

Although the preferred embodiments of the present invention have been described above, the embodiments disclosed herein are not intended to limit the technical idea of the present invention, but are provided to explain the technical idea of the present invention. Therefore, the technical idea of the present invention includes not only each of the embodiments disclosed herein but also a combination of the embodiments disclosed here, and furthermore, the scope of the technical idea of the present invention is not limited by these embodiments. In addition, those skilled in the art to which the present invention pertains may make numerous changes and modifications to the present invention without departing from the spirit and scope of the appended claims, and all of such appropriate changes and modifications shall be regarded as falling within the scope of the present invention as equivalents.

What is claimed is:

1. A rapid charge and discharge system comprising:
an inverter connected to a battery and including first to third switch legs to operate to charge or discharge the battery, the inverter including a plurality of switches;
first to third inductors each having one end connected to a node between two switches included in a corresponding one of the first to third switch legs of the plurality of switches, and the other end connected to a corresponding one of three phases of a motor;
first to third capacitors each having one end connected to the other end of a corresponding one of the first to third inductors, and the other end being grounded;
first to third terminals each having one end connected to the other end of a corresponding one of the first to third inductors;
a load connected to the first to third terminals; and
a control unit controlling at least one of the plurality of switches included in the inverter to be in a charging mode or a discharging mode according to a type of the load,
a relay, controlled by the control unit, determines whether to connect the first to third terminals and the load to each other,
wherein the control unit performs initialization when the load is connected to the first to third terminals, and during the initialization, when a phase current is generated in the motor or a position of a rotor of the motor is changed, the control unit stores an initialization error occurrence record, and controls the relay to be turned off or stops the operation of the inverter.

2. The rapid charge and discharge system of claim 1, wherein all of the other ends of the first to third terminals are connected to the load, such that the three phases of the motor are shorted.

3. The rapid charge and discharge system of claim 1, further comprising a DC link capacitor connected to the battery in parallel.

4. The rapid charge and discharge system of claim 3, further comprising:
   a current sensor sensing a current flowing between the first to third inductors and the first to third switch legs;
   a first voltage sensor sensing a voltage between the first to third inductors and the motor; and
   a second voltage sensor sensing a voltage of the DC link capacitor,
   wherein the control unit controls the at least one of the plurality of switches included in the inverter using values sensed by the current sensor, the first voltage sensor, and the second voltage sensor.

5. The rapid charge and discharge system of claim 3, further comprising:
   a current sensor sensing a current flowing between the first to third inductors and the first to third switch legs; and
   a second voltage sensor sensing a voltage of the DC link capacitor,
   wherein the load is a charging load that transmits charging voltage information to the control unit, and
   the control unit controls the at least one of the plurality of switches included in the inverter using values sensed by the current sensor and the second voltage sensor with the charging voltage information received from the charging load.

6. The rapid charge and discharge system of claim 1, wherein the control unit controls the inverter to be in the charging mode or the discharging mode after the initialization, and when a phase deviation of a three-phase current of the motor is greater than a reference value, the control unit stores a contact defect occurrence record, and controls the relay to be turned off or stops the operation of the inverter.

7. The rapid charge and discharge system of claim 1, wherein after the initialization, the control unit controls the inverter to be in the charging mode or the discharging mode, and when an RPS value changes, the control unit stores a contact defect occurrence record, and controls the relay to be turned off or stops the operation of the inverter.

8. The rapid charge and discharge system of claim 1, wherein after the initialization, the control unit stops the operation of the inverter after discharging the first to third inductors and the first to third capacitors.

9. The rapid charge and discharge system of claim 8, wherein in a process of discharging the first to third inductors and the first to third capacitors, when a discharge voltage time constant is out of a reference value, the control unit stores a discharge error occurrence record, and controls the relay to be turned off or stops the operation of the inverter.

* * * * *